(12) United States Patent
Eckl (10) Patent No.: US 7,587,218 B2
(45) Date of Patent: Sep. 8, 2009

(54) USING POWER OF A PILOT CHANNEL TO CONTROL OUTPUT POWER FROM A TRANSMITTER

(75) Inventor: Wolfgang Franz Eckl, Spardorf (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 634 days.

(21) Appl. No.: 10/952,455

(22) Filed: Sep. 28, 2004

(65) Prior Publication Data

US 2006/0068828 A1    Mar. 30, 2006

(51) Int. Cl.
H04B 7/00  (2006.01)
(52) U.S. Cl. ..................................... 455/522
(58) Field of Classification Search .................. 455/522
See application file for complete search history.

(56) References Cited

U.S. PATENT DOCUMENTS

| 5,895,997 | A * | 4/1999 | Puskas et al. | 310/316.01 |
| 5,902,507 | A * | 5/1999 | Wiezbowski et al. | 219/615 |
| 6,609,361 | B2 * | 8/2003 | Vugdelija | 60/39.182 |
| 6,785,247 | B1 * | 8/2004 | Lee | 370/311 |
| 7,262,981 | B2 * | 8/2007 | Stevanovic et al. | 363/132 |
| 2002/0093933 | A1 | 7/2002 | Ozluturk et al. | |
| 2002/0160767 | A1 | 10/2002 | Hanly | 455/422 |
| 2003/0010037 | A1 * | 1/2003 | Vugdelija | 60/772 |
| 2003/0181220 | A1 * | 9/2003 | Lee et al. | 455/561 |
| 2006/0188194 | A1 * | 8/2006 | Ghandi et al. | 385/16 |

OTHER PUBLICATIONS

"Power control and QoS of a CDMA based hierarchical cell structure network" by Seung Hoon Shin, et al—Tencon 99. Proceedings of the IEEE Region 10 Conference Cheju Island, South Korea Sep. 15-17, 1999, Piscataway, N.J., USA, IEEE, US, vol. 2, Sep. 15, 1999, pp. 1220-1223.

* cited by examiner

Primary Examiner—Matthew D Anderson
Assistant Examiner—Bobbak Safaipour (57) ABSTRACT

The present invention provides a method and an apparatus for using power of a pilot channel to control an output power from a transmitter, such as a base station transmitting spread spectrum signals. In one embodiment, a method for controlling an output power from a transmitter associated with a communication node (e.g., Node B) in a wireless network, such as a digital cellular network is provided. The method comprises extracting an indication of a pilot channel power from a portion of an output signal of the transmitter and controlling a control loop having one or more control devices in the transmitter based on the indication of a pilot channel power such that the pilot channel power stays substantially constant over a period of time. In this manner, using a closed power loop controller, a transmitter may overcome the problem of measuring the power of a non-constant spread spectrum signal and a traffic independent measure may control a cell size. Compared to a gain control loop, a relatively more precise control of the cell size may be provided using a significantly less measurement components.

15 Claims, 6 Drawing Sheets

USING POWER OF A PILOT CHANNEL TO CONTROL OUTPUT POWER FROM A TRANSMITTER

BACKGROUND OF THE INVENTION

1. Field of the Invention

This invention relates generally to telecommunications, and more particularly, to wireless communications.

2. Description of the Related Art

Advances in wireless technology have transformed mobile communications, leading to widespread acceptance and use of cellular technology. However, increasing system capacity to meet this increased demand while maintaining a quality of services to users of mobile communications systems with a limited number of radio channels presents a constant challenge. To support a range of voice and data communications, as well as video, in mobile communication systems, a geographic service area may be partitioned into a number of cells. Each cell has a cell site (also called a base station) connected to a wireline network. The cell site establishes a wireless link over radio channels with wireless communication devices, such as mobile devices within the cell. The mobile device users or subscribers of a wireless service, may send and receive information (e.g. text, audio, speech, or video) via a Public Switched Telephone Network (PSTN). As the mobile device users move from one cell to another cell, their communications may be handed-off to a new cell without an interruption in the wireless service.

In Global System for Mobile Communications (GSM) systems, cell size is directly correlated to the output power of a base station. The output power signal of a GSM base station may be measured and controlled using power control loops because the output power signal is a constant envelope signal. That is, the actual output power is independent of the modulation content of the GSM signal.

However, in many Third Generation (3G) mobile communication systems, such as a Universal Mobile Telecommunications System (UMTS), the situation is different. The UMTS uses signals with higher modulation schemes. These signals have non-constant power envelopes. Depending on the modulation content, the actual output power may vary. A measure for this variation is the ratio between the output power peaks and the long time average of the signal power. This peak to average ratio can vary by 10 dB for the UMTS and a Code Division Multiple Access (CDMA) 2000 signals. Additionally, the long time average output power may vary with the amount of traffic in the wireless network. Thus, the average output power when no user traffic is present is much lower than the average output power with substantial user traffic. This effect is called power rise. So the actual and the average output power no longer is an accurate measure for the power setting needed to cover a certain cell size.

To address some of the above described problems while measuring and controlling the output power of a non-constant envelope signal, the gain of the most important stages is kept constant. This is mainly done by taking a fraction of the actual output power and comparing it with a fraction of the actual input power using a gain control loop. The gain control loop merely compares the input and output signals, especially when handling a fast time variant signal like a CDMA or a Wideband-CDMA modulated signal. However, the comparison must be done using the same absolute time intervals for the input and output signals, providing a relatively imprecise control of a cell size while using a substantially large number of measurement components in the gain control loop.

One disadvantage of this technique is that every transmitter stage inside the gain control loop adds delay to the output signal. Therefore, a time synchronization of the input signal must be performed prior to the comparison. Thus, may additional delay element may be needed. The second disadvantage is the fact that a constant gain per se does not indicate a constant output signal behavior. That is, an unwanted signal variation at the input signal side is directly transferred to the output signal side. The third disadvantage is the fact that the gain control loop only keeps one of the four transmission parameters constant. But the overall transmission of a chain of multiple radio frequency (RF) stages is determined by all four S-parameters of each stage. Any imperfection in the uncontrolled S-parameter values typically leads to an uncontrolled signal variation on the output signal. However, these variations are not covered by the gain control loop.

The present invention is directed to overcoming, or at least reducing, the effects of, one or more of the problems set forth above.

SUMMARY OF THE INVENTION

In one embodiment of the present invention, a method is provided for controlling an output power from a transmitter associated with a communication node in a wireless network. The method comprises extracting an indication of a pilot channel power from a portion of an output signal of the transmitter and controlling a control loop having one or more control devices in said transmitter based on the indication of a pilot channel power such that the pilot channel power stays substantially constant over a period of time.

In another embodiment, a transmitter associated with a communication node in a wireless network to communicate with a mobile device. The transmitter may comprise an extractor to derive an indication of a pilot channel power from a portion of an output signal of the transmitter and a control device coupled to the extractor. The control device may control a control loop in the transmitter based on the indication of a pilot channel power such that the pilot channel power stays substantially constant over a period of time.

In yet another embodiment, a digital cellular network may comprise a plurality of cells to communicate with a mobile device over a wireless medium, wherein at least one of the plurality of cells may include a base transceiver station having a base station transmitter. The base station transmitter may include an extractor to derive an indication of a pilot channel power from a portion of an output signal of the base station transmitter and a control device coupled to the extractor. The control device may control a closed power control loop in the base station transmitter based on the indication of a pilot channel power such that the pilot channel power stays substantially constant over a period of time.

In still another embodiment, a telecommunication system may comprise a communication node associated with a wireless network. The communication node may communicate with a mobile device. The communication node may include a transmitter for enabling mobile communications with the mobile device over a wireless medium using a pilot channel. The transmitter may include an extractor to derive an indication of a pilot channel power from a portion of an output signal of the transmitter and a control device coupled to the extractor. The control device may control a closed power control loop in the transmitter based on the indication of a pilot channel power such that the pilot channel power stays substantially constant over a period of time.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of this disclosure.

Generally, a method of using a channel power of a pilot channel to control the output power from a transmitter, such as a base transceiver station (BTS) transmitting spread spectrum signals to mobile devices is provided. By analyzing the content of a transmitter output signal, a pilot channel power may be determined. While the output power from a base station may be a measure of a BTS range and performance, the pilot channel power may be a measure of the BTS range to the mobile devices. The pilot channel power may be used for controlling a signal metric, such as the gain or attenuation of one or more control elements in a transmitter of a BTS. In this manner, a pilot channel closed power control loop may be installed, which may be implemented in either in an analog or digital manner. A portion of the transmitter output signal of a BTS may be fed to a code domain analyzer to extract the pilot channel power of this signal. The code domain power of the pilot channel may be independent of the amount of traffic and also not affected by the peak to average ratio of the transmitter output signal. A closed loop controller may set the signal metric of a control element of the transmitter so that the pilot channel power stays constant.

Figure 1:
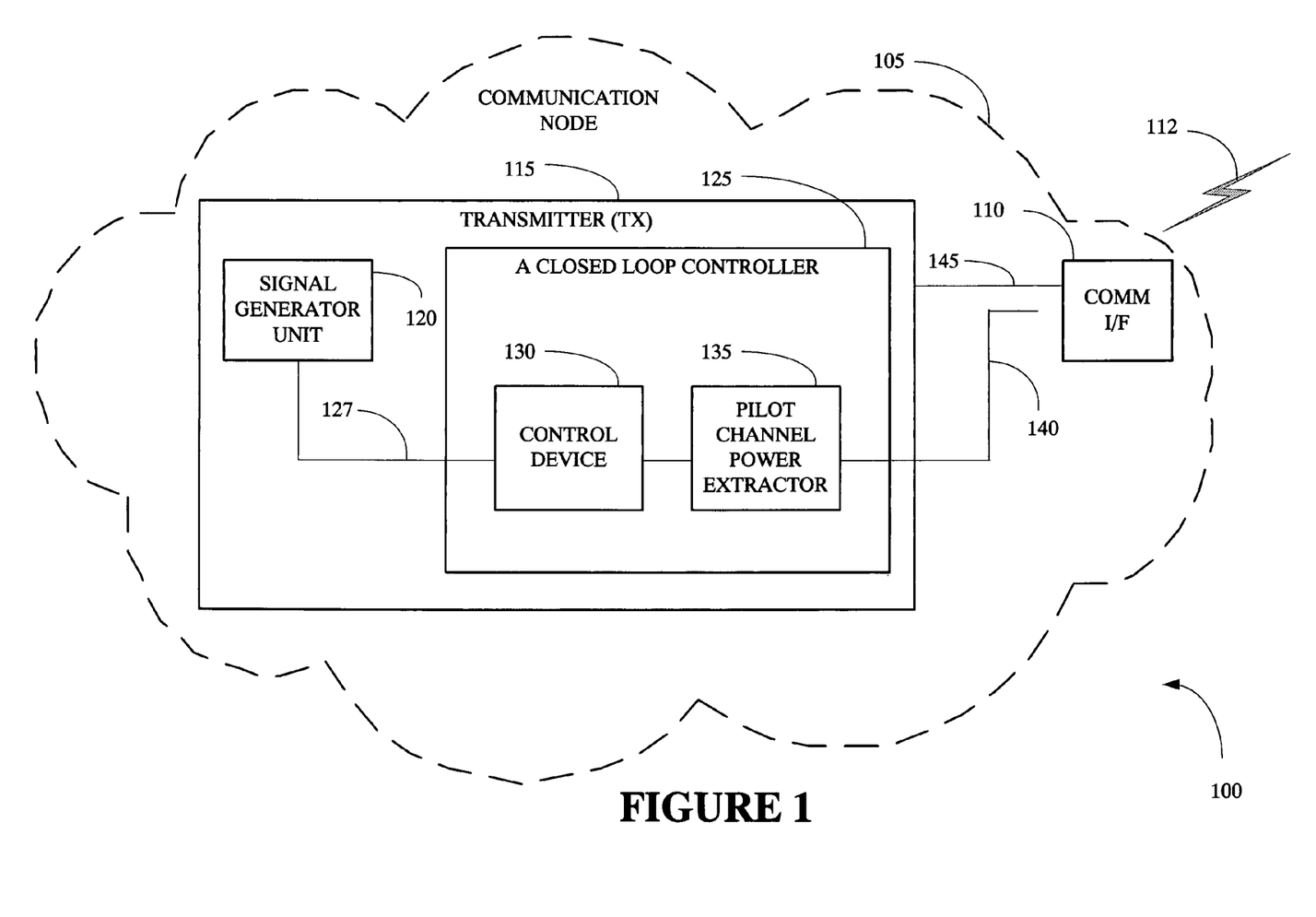
FIG. 1 illustrates a transmitter including a closed loop controller to control output power from the transmitter using power of a pilot channel according to one illustrative embodiment of the present invention.

Referring to FIG. 1, a telecommunication system 100 includes a communication node 105 (e.g., a BTS) that includes a communication interface (COMM I/F) 110 to communicate with a mobile device over a wireless medium 112 using a pilot channel within a service area according to one embodiment of the present invention. While the COMM I/F 110 may include a conventional radio frequency front end and an antenna system for mobile communications, the wireless medium 112 may be capable of handling mobile communication signals, such as cellular signals. For example, the wireless medium 112 may operate according to a Code Division Multiple Access (CDMA) standard or a Global System for Mobile Communications (GSM) standard, which is a land mobile pan-European digital cellular radio communications system.

In one embodiment, the service area of the telecommunication system 100 may be partitioned into connected service domains known as cells, where radio device users may communicate via radio frequency uplinks with the communication node 105, such as a BTS. The communication node 105 may be coupled to a wireless network in some embodiments of the present invention. The radio frequency uplink may involve a signal transmission from a mobile device to a BTS, forming a reverse communication link. A BTS (e.g., Node B) may be a piece of equipment used for communicating with the mobile devices and is coupled to a cell or a sector within a cell.

For the communication node 105, e.g., when used in a CDMA wireless mobile communication system, a pilot channel may be a special channel that a BTS transmits constantly or regularly. The pilot channel may be transmitted using Walsh code channel 0, which is all 0's, and using a bit pattern of all 0's, containing a short code at the phase being used by the BTS. A system acquisition by a mobile device, such as a cell phone typically may begin by locating the pilot channel, which may permit the cell phone to synchronize its short code with the BTS. Specifically, the pilot channel may be an unmodulated, direct-sequence spread spectrum signal transmitted continuously by a CDMA base station. This pilot channel may allow a mobile device to acquire the timing of a forward CDMA channel, providing a phase reference for coherent demodulation, and providing a means for signal strength comparisons between the base stations for determining when to handoff a call.

The communication node 105 may comprise a transmitter (TX) 115 which enables mobile communications with the mobile device over the wireless medium 112 using the pilot channel. In this way, the communication node 105 using the transmitter 115 may send or receive, voice, data, or a host of voice and data services in different—generation of wireless networks including digital cellular networks based on standards including Universal Mobile Telecommunications System (UMTS) and 3G-1X (CDMA) 2000), as well as IS-95 CDMA, Global System for Mobile Communication (GSM) and Time Division Multiple Access (TDMA).

According to one illustrative embodiment of the present invention, the transmitter 115 may comprise a signal generator unit 120 coupled to a closed loop controller 125. While the signal generator unit 120 may generate an input signal 127 for the transmitter 115, the closed loop controller 125 controls an output power from the transmitter 115 using a power of the pilot channel.

The closed loop controller 125 may comprise a control device 130 coupled to a pilot channel power extractor 135, in one embodiment. The control device 130 may control a closed power control loop in the transmitter 115 based on the indication of a pilot channel power such that the pilot channel power stays substantially constant for a period of time. The pilot channel power extractor 135 may derive an indication of a pilot channel power from a portion 140 of an output signal 145 of the transmitter 115. The output signal 145 may be defined at least in part by a Third Generation (3G) mobile communication standard based on a Universal Mobile Telecommunications System (UMTS) protocol, in one embodiment.

In operation, the closed loop controller 125 may set a signal metric of the control device 130 in response to the indication of a pilot channel power. The signal metric may include at least one of gain and attenuation of the control device 130, according to one embodiment. The communication interface 110 may transmit the output signal 145 from the transmitter 115 over the wireless medium 112. Consistent with one embodiment, a number of suitable network technologies and conventional communication protocols may be deployed based on a particular application to transmit the output signal 145 from the communication node 105.

Figure 2:
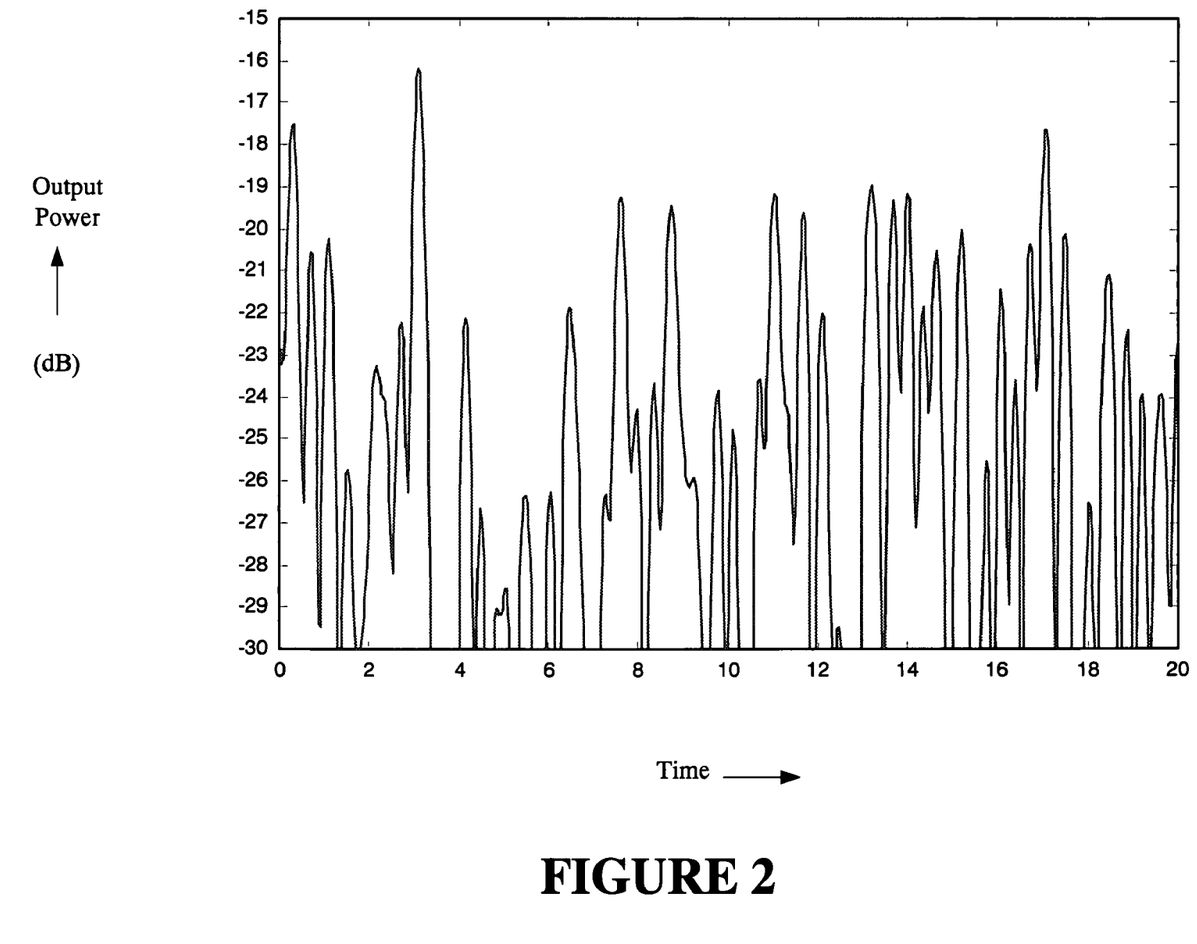
FIG. 2 illustrates a non-constant spread spectrum signal indicating the output power from the transmitter shown in FIG. 1 in accordance with one embodiment of the present invention.

Referring to FIG. 2, a non-constant spread spectrum signal from the transmitter 115, such as a BTS in a cellular network, is depicted in accordance with one illustrative embodiment of the present invention. More specifically, the output power (dB) over time (measured in chip duration) is shown for the non-constant spread spectrum signal, i.e., the output signal 145 from the transmitter 115, as shown in FIG. 1. The non-constant spread spectrum signal shown in FIG. 2 depicts a peak-to-average ratio of 10 dB for the output signal 145 from the transmitter 115.

Using the closed loop controller 125, the transmitter 115 may measure the power of a non-constant power envelope of the non-constant spread spectrum signal. That is, by analyzing the content of the non-constant spread spectrum signal, which may be a UMTS signal, the pilot channel may be determined from the output signal 145 of the transmitter 115. The power of the pilot channel may be used for controlling the gain or attenuation of the control device 130 in the transmitter 115 of the communication node 105, which may be a base transceiver station (e.g., Node B), in accordance with one embodiment of the present invention.

Figure 3:
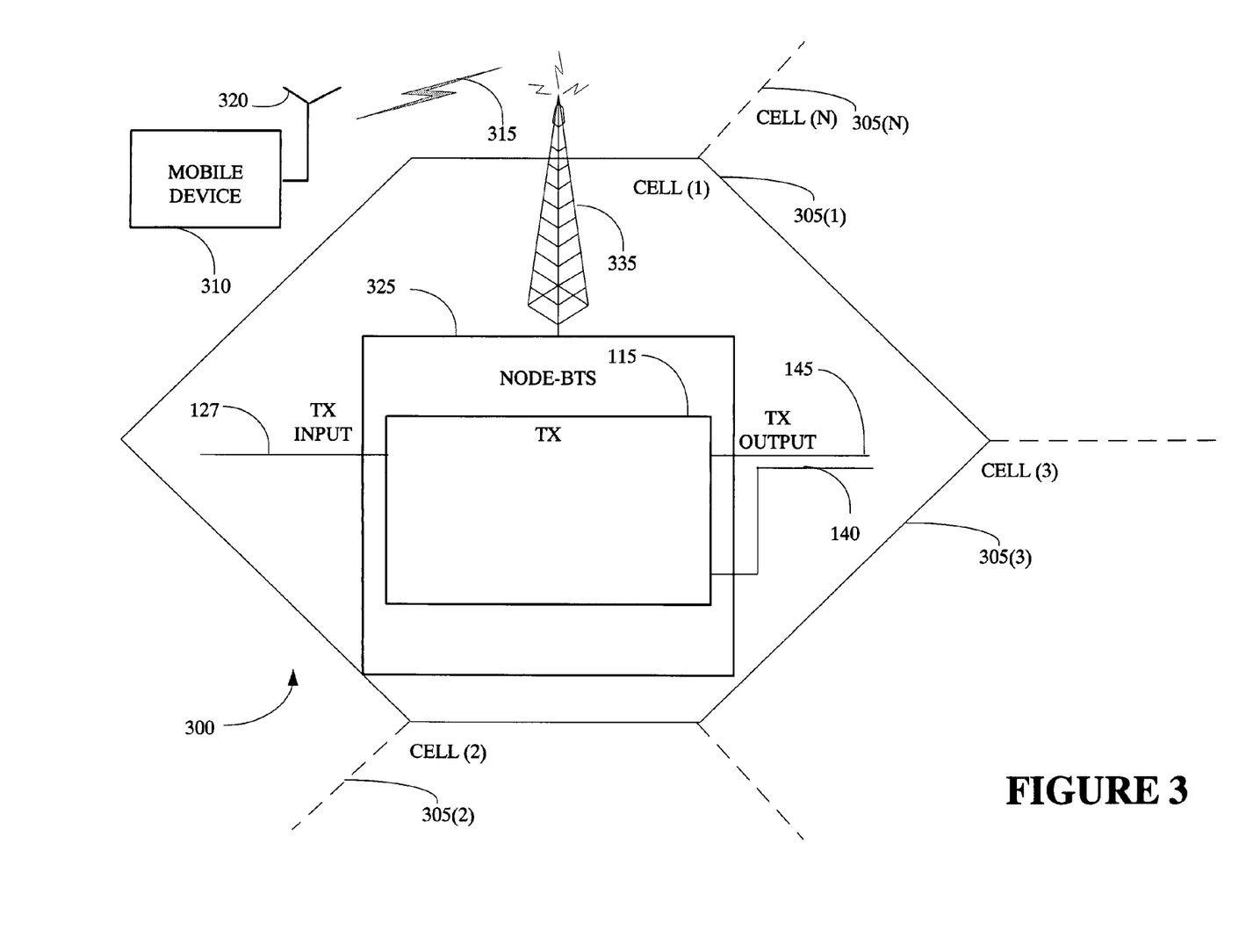
FIG. 3 illustrates a digital cellular network including the closed loop controller shown in FIG. 1 according to one illustrative embodiment of the present invention.

Referring to FIG. 3, a digital cellular network 300 covers a service area that may be partitioned into connected service domains shown as a plurality of cells 305 (1-N), where a mobile device 310 user may communicate via a radio frequency link 315 using an antenna 320 with a node base transceiver station (NODE-BTS) 325 according to one illustrative embodiment of the present invention. The NODE-BTS 325 may comprise the transmitter 115 shown in FIG. 1. Using an antenna system 335, the NODE-BTS 325 may communicate with the mobile device 310 associated with the cell 305 (1). That is, the cell 305(1) may be radiated by the antenna system 335 associated with the NODE-BTS 325 to communicate with the mobile device 310 within a cell coverage area.

Within the NODE-BTS 325, the transmitter 115 may receive a transmitter (TX) input signal 127 and transmit a transmitter output signal 145, such as a spread spectrum signal in accordance with one embodiment of the present invention. The spread spectrum signal may include the non-constant power envelope shown in FIG. 2 and may be defined, at least in part, by a Third Generation (3G) mobile communication standard based on a Universal Mobile Telecommunications System protocol.

The closed loop controller 125 may analyze the modulation content of the transmitter output signal 145 which may be defined at least in part by a universal mobile telecommunication systems protocol to derive a pilot channel. From the portion 140 of the transmitter output signal 145, the closed loop controller 125 may measure an output power of the non-constant power envelope in the transmitter output signal 145, in turn, deriving a measure of power for the cell 305(1) in the digital cellular network 300.

The closed loop controller 125 may set the measure of power for the cell 305(1) such that the output power from the NODE-BTS 325 covers a predetermined cell size. The closed loop controller 125 may determine a code domain power of the pilot channel to establish a closed power control loop, in one embodiment. The code domain power quantifies a base station's, such as the NODE-BTS 325 response to instructions from the digital cellular network 300. In a CDMA system, because the user transmissions are isolated from one another by their unique individual codes, the power in each of the codes is expressed in decibel (dB) relative to the total transmitter 115 power in a channel. The code domain power of the pilot channel may be determined by the pilot channel power extractor 135 form a base station sector of the NODE-BTS 325 producing a combination of a pilot channel, a sync channel, a paging channel and six traffic channels. In this manner, the closed loop controller 125 may control a size of the cell 305(1) in the digital cellular network 300 based on a measure that is independent of traffic in a communication with the mobile device 310.

Figure 4:
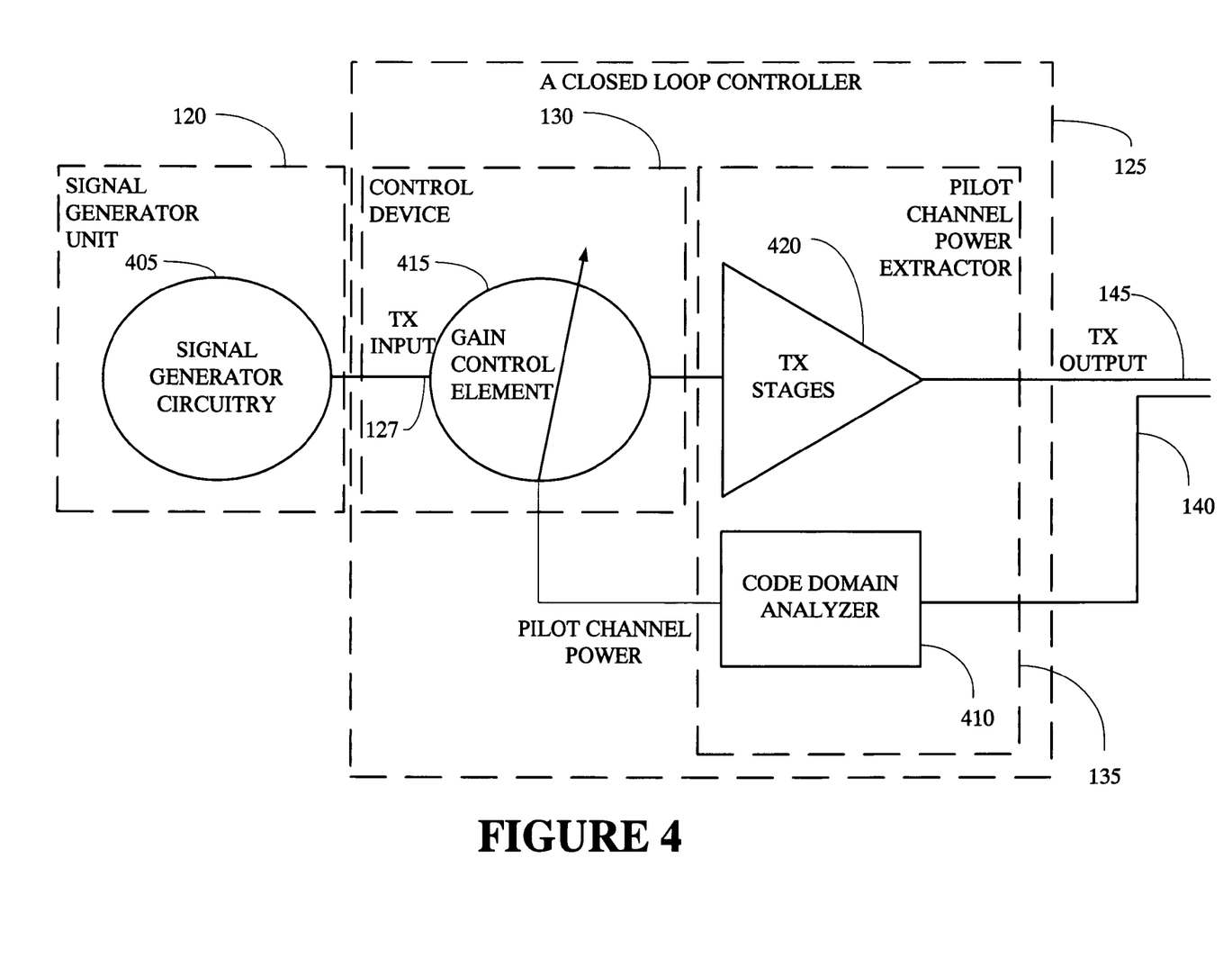
FIG. 4 illustrates a pilot channel power control loop for the closed loop controller shown in FIG. 1 according to one illustrative embodiment of the present invention.

Referring to FIG. 4, a pilot channel closed power control loop for measuring a pilot channel power in the transmitter 115 is shown in accordance with one illustrative embodiment of the present invention. The signal generator unit 120 may comprise signal generator circuitry 405 capable of providing the transmitter input signal 127 to the closed loop controller 125 in the closed power control loop shown in FIG. 1. In one embodiment, the signal generator circuitry 405 may be a conventional circuit of a wireless communication device that may generate a transmit signal. The control device 130 of the closed loop controller 125 may comprise a gain control element 415, such as a variable frequency gain amplifier or attenuator. The pilot channel power extractor 135 may comprise a code domain analyzer 410 and a plurality of transmitter (TX) stages 420. While the code domain analyzer 410 may determine a code domain power of the pilot channel to establish the pilot channel closed power control loop, the plurality of transmitter stages 420 may include conventional components, such as an amplifier or a mixer.

The code domain analyzer 410 using the code domain power of the pilot channel may control the gain control element 415, setting the gain based on the pilot channel power in the pilot channel closed power control loop. The plurality of transmitter stages 420 may provide the transmitter output signal 145 in such a way that the pilot channel power may be maintained at a constant level over a period of time, temperature frequency and/or traffic amount, in one embodiment.

In one embodiment, the gain control element 415 that drives the plurality of transmitter stages 420 may be a variable radio frequency (RF) gain amplifier or a variable RF attenuator. However, the gain control element 415 may be part of the signal generator circuitry 405, implementing a digital control loop in the closed loop controller 125. That is, the pilot channel closed power control loop may be implemented in an analog or a digital manner depending upon a particular application. While the code domain power of the pilot channel determined by the code domain analyzer 410 may be independent of the amount of traffic and may not get affected by the peak-to-average ratio of the transmitter output signal 145, the pilot channel power may control the gain or attenuation of the gain control element 415 based on the portion 140 of the transmitter output signal 145.

Figure 5:
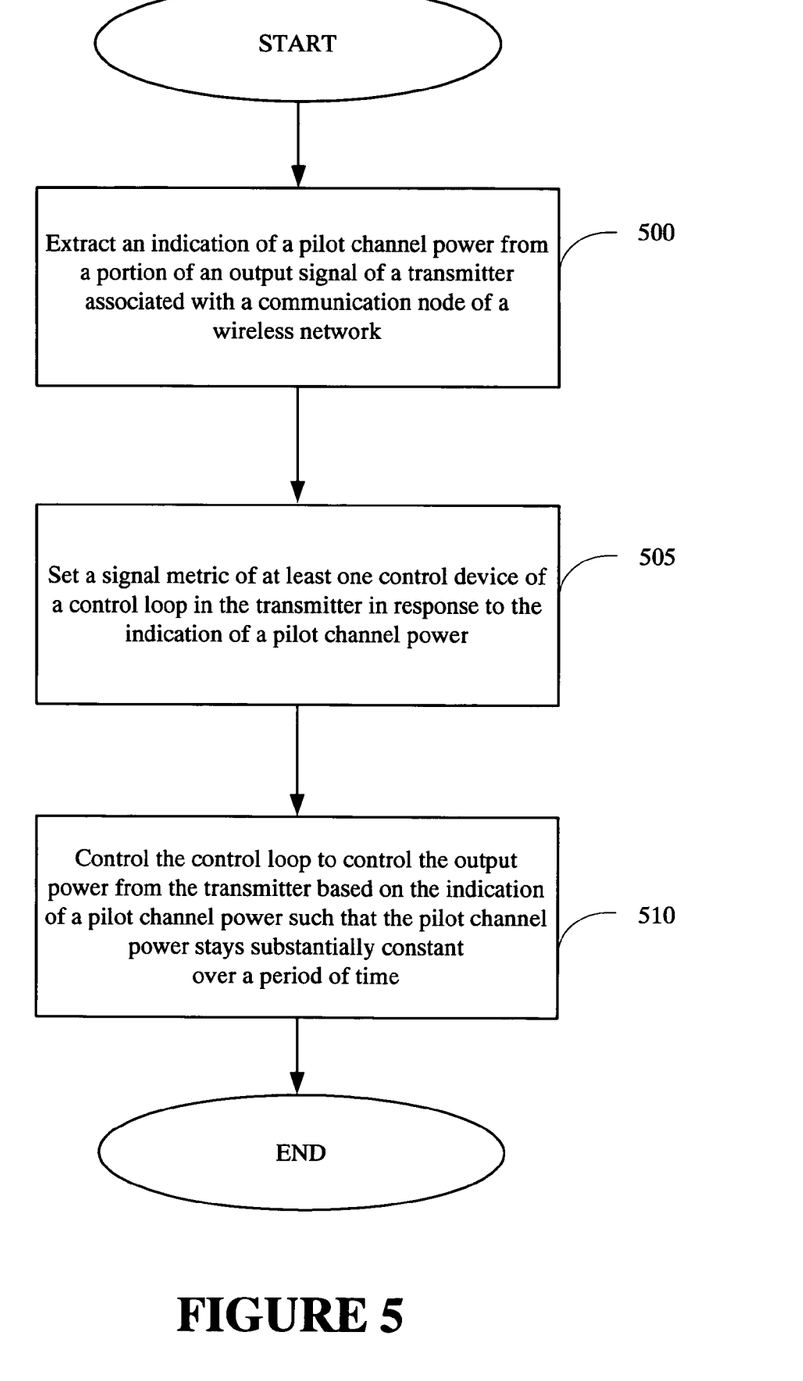
FIG. 5 illustrates a stylized representation of a method for controlling an output power from the transmitter, as shown in FIG. 1, associated with a communication node in a wireless network according to one illustrative embodiment of the present invention.

Referring to FIG. 5, a stylized representation of a flowchart implementing a method for controlling the output power from the transmitter 115 associated with the communication node 105 shown in FIG. 1 in a wireless network, such as the digital cellular network 300 shown in FIG. 3 is depicted in accordance with one illustrative embodiment of the present invention. At block 500, an indication of a pilot channel power may be extracted by the pilot channel power extractor 135 from the portion 140 of the transmitter output signal 145. In response to the indication of a pilot channel power, at block 505, a signal metric of the control device 130 may be set within a control loop, such as the pilot channel closed power control loop shown in FIG. 4. At block 510, the control loop may be controlled to control the output power from the transmitter 115 based on the indication of the pilot channel power such that the pilot channel power stays substantially constant over a period of time, in one embodiment.

Figure 6:
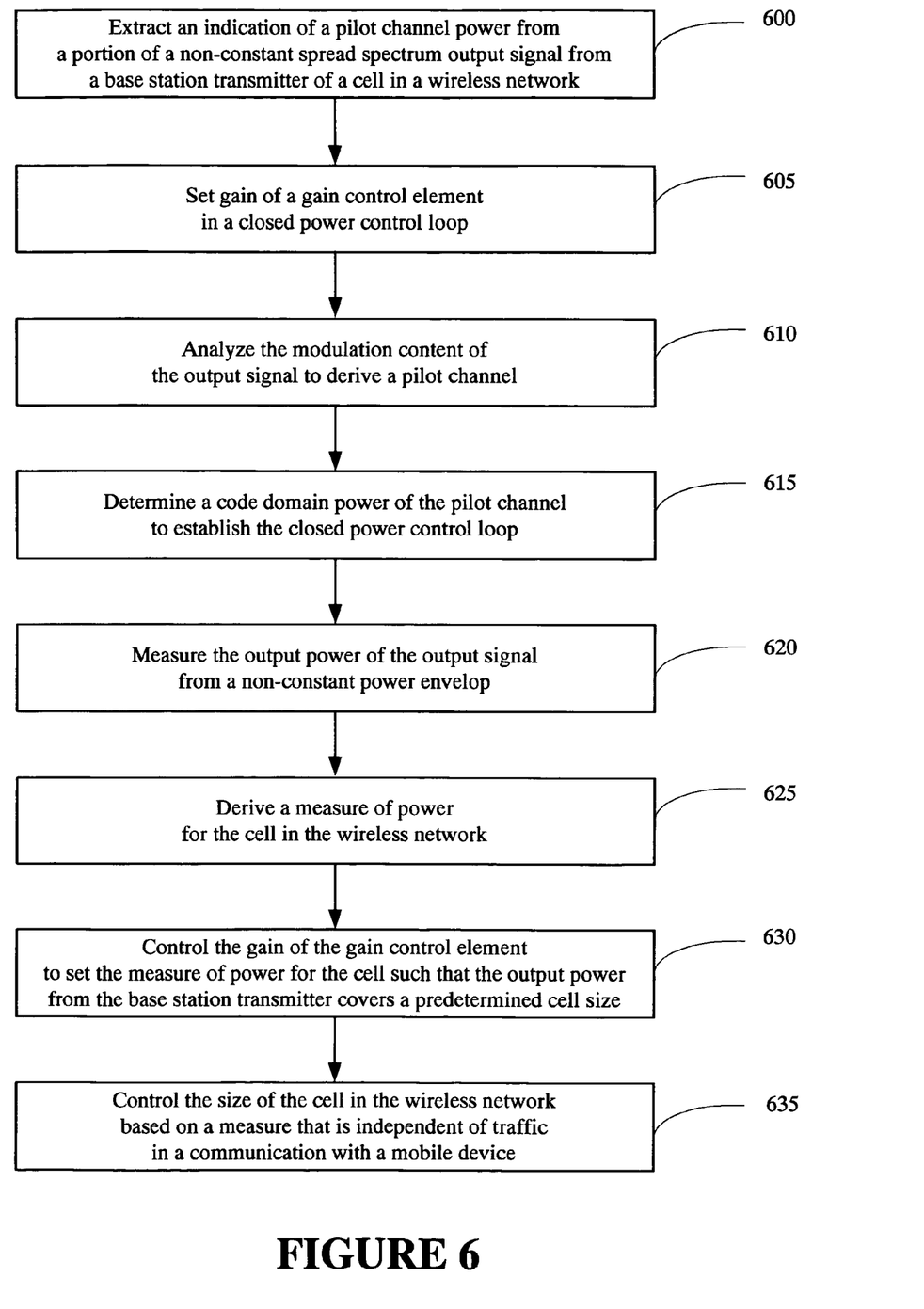
FIG. 6 illustrates a stylized representation of a method for controlling the size of a cell in a wireless network, such as the digital cellular network shown in FIG. 3 based on a measure that is independent of traffic in a communication with a mobile device in accordance with one illustrative embodiment of the present invention.

Referring to FIG. 6, a stylized representation of a flowchart implementing a method for controlling a size of a cell, such as the cell 305(1) shown in FIG. 3 in the digital cellular network 300 based on a measure that is independent of traffic in a communication with the mobile device 310 is depicted in accordance with one illustrative embodiment of the present invention. At block 600, an indication of a pilot channel power may be extracted by the pilot channel power extractor 135 from the portion 140 of the non-constant spread spectrum output signal shown in FIG. 2. The non-constant spread spectrum output signal may be from the transmitter 115, such as a base station transmitter of the cell 305(1) in the digital cellular network 300.

At block 605, in the pilot channel closed power control loop shown in FIG. 4, the gain control element 415 may be adjusted to set its gain based on the pilot channel power determined by the code domain analyzer 410. At block 610, the modulation content of the non-constant spread spectrum output signal may be analyzed by the pilot channel power extractor 135 to derive a pilot channel. The code domain analyzer 410 may determine a code domain power of the pilot channel to establish the pilot channel closed power control loop, as indicated at block 615.

At block 620, the output power of the non-constant spread spectrum output signal may be measured from a non-constant power envelope shown in FIG. 2. At block 625, a measure of power for the cell 305(1) in the digital cellular network 300 may be derived by the closed loop controller 125. The control loop controller 125 may control the gain of the gain control element 415 to set the measure of power for the cell 305(1) such that the output power from the transmitter 115 covers a predetermined cell size, as indicated in block 630. At block 635, the closed loop controller 125 may control the size of the cell 305(1) in the digital cellular network 300 based on a measure that is independent of traffic in a communication with the mobile device 310 shown in FIG. 3.

In some embodiments, using the closed loop controller 125, the transmitter 115 may advantageously overcome the problem of measuring the power of the non-constant spread spectrum signal shown in FIG. 2. Additionally, a traffic independent measure for controlling the cell size may be provided. The pilot channel code domain power may be used to establish a power control loop, compared to a gain control loop, reaching a relatively more precise control of the cell size using a significantly less measurement components.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for controlling an output power of a spread spectrum signal having a non-constant power envelope that is transmitted from a transmitter associated with a communication node in a wireless network, the spread spectrum signal configured to support a plurality of channels including a pilot channel, the method comprising:

extracting an indication of a pilot channel power used to transmit signals on the pilot channel from the spread spectrum signals transmitted by said transmitter; and adjusting a gain applied to the spread spectrum signal transmitted by the transmitter based on the indication of the pilot channel power such that the pilot channel power stays substantially constant when the output power of the spread spectrum signal having the non-constant power envelope varies.

2. A method, as set forth in claim 1, further comprising:
setting a signal metric of at least one control device a control loop that is used to adjust the gain of said transmitter in response to the indication of a pilot channel power.

3. A method, as set forth in claim 2, wherein setting a signal metric further comprising:
controlling at least one of gain and attenuation of said at least one control device.

4. A method, as set forth in claim 1, wherein controlling a control loop further comprising:
controlling the output power of a base station transmitting spread spectrum signals.

5. A method, as set forth in claim 4, wherein controlling the output power of a base station further comprising:
controlling the output power of a non-constant spread spectrum signal from said base station, wherein the non-constant spread spectrum signal is defined at least in part by a 3G mobile communication standard based on a Universal Mobile Telecommunications System protocol.

6. A method, as set forth in claim 1, further comprising:
analyzing the modulation content of the output signal defined at least in part by a Universal Mobile Telecommunications System protocol to derive a pilot channel.

7. A method, as set forth in claim 6, further comprising:
measuring the output power of the output signal from a non-constant power envelope to derive a measure of power for a cell in the wireless network.

8. A method, as set forth in claim 7, further comprising:
setting the measure of power for said cell in the wireless network such that the output power from said transmitter covers a predetermined cell size.

9. A method, as set forth in claim 6, further comprising:
determining a code domain power of the pilot channel to establish said control loop.

10. A method, as set forth in claim 9, further comprising:
controlling a size of a cell in the wireless network based on a measure that is independent of traffic in a communication with a mobile device.

11. A transmitter associated with a communication node in a wireless network to communicate with a mobile device, the transmitter being configured to generate a spread spectrum signal that has an output power that carries in time, the spread spectrum signal configured to support a plurality of channels including a pilot channel, said transmitter comprising:
an extractor to derive an indication of a pilot channel power used to transmit signals on the pilot channel from the spread spectrum signals transmitted by said transmitter; and
a control device coupled to said extractor, said control device to control a control loop in said transmitter to adjust a gain applied to the spread spectrum signal transmitted by the transmitter based on the indication of the pilot channel power such that the pilot channel power stays substantially constant when the output power of the spread spectrum signal having the non-constant power envelope varies.

12. A transmitter, as set forth in claim 11, further comprising:
a closed loop controller that sets a signal metric of said control device in response to the indication of a pilot channel power.

13. A transmitter, as set forth in claim 12, wherein said closed loop controller controls at least one of gain and attenuation of said control device.

14. A transmitter, as set forth in claim 11, wherein said transmitter is a base station transmitter that transmits spread spectrum signals.

15. A transmitter, as set forth in claim 14, wherein said spread spectrum signals include a non-constant spread spectrum signal defined at least in part by a 3G mobile communication standard based on a Universal Mobile Telecommunications System protocol.

* * * * *